Nov. 26, 1968 W. L. BLOOM ETAL 3,412,620

UNIDIRECTIONAL ROTATION TRANSMISSION DEVICE

Original Filed Dec. 18, 1964

INVENTORS.
Walter L. Bloom
William D. Tinsley, Jr.

ATTORNEY

United States Patent Office 3,412,620
Patented Nov. 26, 1968

3,412,620
UNIDIRECTIONAL ROTATION TRANSMISSION DEVICE
Walter L. Bloom, Johnson's Ferry Road, Rte. 3, and William D. Tinsley, Jr., Steinhaur Road, Rte. 6, both of Marietta, Ga. 30060
Continuation of application Ser. No. 419,412, Dec. 18, 1964. This application Apr. 14, 1967, Ser. No. 631,100
1 Claim. (Cl. 74—141)

ABSTRACT OF THE DISCLOSURE

A transmission device for changing linear motion into unidirection rotation of a shaft member such as the film drive shaft of a projector for advancing the film strip in frame-by-frame sequence and includes a release means that disconnects the transmission device from the drive shaft for selective alignment therewith so that the frame to be shown is properly centered for projection. The transmission means includes a first member that is freely and rotatably mounted on the film drive shaft and which is connected to a drive means; a check means that is positioned between the first member and the film drive shaft for selectively connecting the first member and the drive shaft in driving relation; and a release means that is carried by said shaft and is rotatable independently thereof to disconnect said shaft from said first member so that the frame to be shown may be centered for projection.

---

A particular utilization of the present invention is in combination with a film projector whereby linear motion of a solenoid is converted into unidirectional rotary motion of the film drive shaft to advance a frame of the film in the projector. The counterrotational adjustment feature of the device in de-activated state allows for proper alignment of the frame of the film within the projector.

In projectors, such as the film strip projectors for showing still pictures, some means must be provided to index the film strip for proper sequential presentation. These mechanisms are most frequently manually operated; however, there has been some attempt at providing automatic means for indexing the film. Automatic means have usually taken the form of a motor driven geneva movement, or simply motor driven sprockets. Geneva movements, however, are quite expensive and difficult to design; and motor driven sprockets are difficult to arrange so that each picture is properly framed after indexing of the film strip.

The device of the present invention overcomes the above-mentioned and other difficulties by providing, in conjunction with the conventional film advance mechanism, a linear motion device with a fixed distance of movement, and a transmission device for converting the linear movement into unidirectional rotary motion of a shaft. At the end of the movement, when the film strip is properly framed, the transmission device allows counter rotation of the device relative to the shaft so that the linear motion device can be reset for advancing the next frame.

The transmission device requires little or no maintenance and is designed to be manufactured economically, but operates very efficiently and positively.

These and other features and advantages will become apparent from consideration of the following specification when taken in conjunction with the accompanying drawing.

Description of the illustrative embodiment

Figure 1:
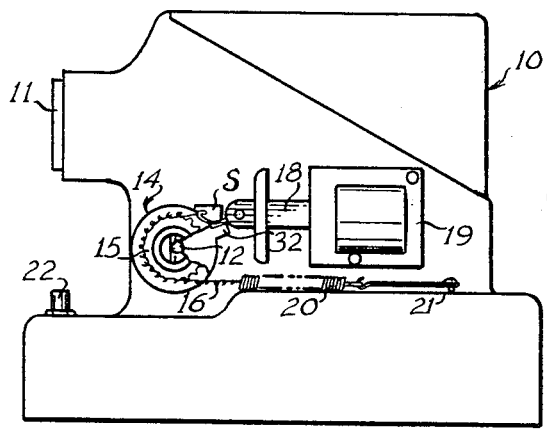
FIG. 1 is a side elevational view of a film strip projector having the transmission device of the present invention mounted thereon.

Referring now more particularly to the drawing and to that embodiment of the invention here chosen by way of illustration, the device shown in FIG. 1 includes a projector generally designated at 10 and having a lens 11. There is a geared film feed (not shown) which is operated by a film advance shaft 12. It will be understood by those skilled in the art that the film feed is arranged so that the shaft 12 will seat at increments of rotation that will bring the pictures into perfect frame.

Attached to the shaft 12, there is the transmission 14 which includes a sprocket 15 over which passes a chain 16. One end of the chain 16 is attached to the plunger 18 of a solenoid 19; and the other end of the chain 16 is attached to a return spring 20, the spring 20 being anchored to the projector housing at 21.

In the embodiment here shown, there is a button 22 mounted on the base of the housing of the projector 10, the button 22 being electrically connected to energize the solenoid 19; however, it will be understood that the button 22 can be located at any desired position; remote or at the projector 10. Thus, when the button 22 is pushed, the solenoid 19 will be energized and cause the plunger 18 to be pulled into the solenoid 19. This will pull the chain 16 and rotate the sprocket 15, and as will be discussed in more detail later, the sprocket 15 will rotate the shaft 12 the distance required to index the film by one frame. The activation of the solenoid 19 may also be accomplished by the utilization of the Controlled Coupling Device disclosed and claimed in U.S. Patent Application Ser. No. 296,672, filed July 22, 1963 by Dr. Walter L. Bloom, a co-inventor in the present application, and Robert E. Meek now U.S. Patent 3,289,016, issued Nov. 29, 1966.

Figure 2:
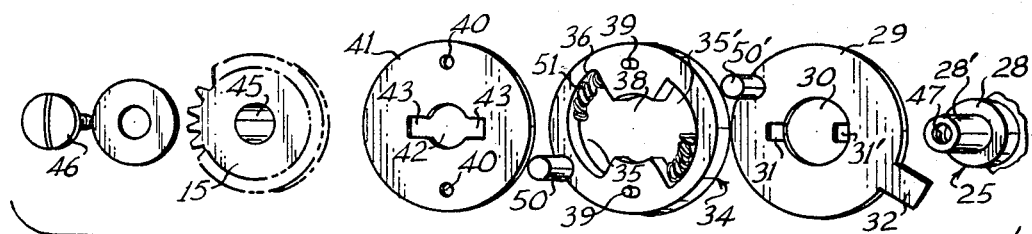
FIG. 2 is an exploded view of the transmission device shown in FIG. 1.
Figure 3:
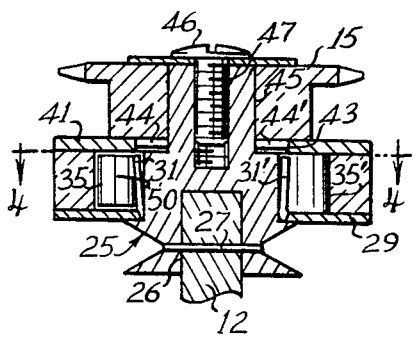
FIG. 3 is a cross-sectional view of the transmission device, taken along a diameter thereof; and,
FIG. 4 is a cross-sectional view taken substantially along the line 4—4 in FIG. 3.

Attention is now directed to FIG. 2 of the drawing where it will be seen that there is a shaft adapter 25 which is received on the shaft 12 and held by a pin 27 as is better shown in FIG. 3. The shaft adapter 25 has a central aperture 26 to receive the shaft 12, and a cylindrical portion 28 concentric about the aperture 26, the cylindrical portion 28 being adapted to receive thereon a release ring 29. The release ring 29 has a central hole 30 substantially the same size as the outer diameter of cylindrical portion 28; and positioned on its inner periphery on a diameter of the hole 30 are two fingers 31 and 31' extending in parallel alignment with cylindrical portion 28. From the outer periphery of the ring 29, there is a radially outwardly extending arm 32. The fingers 31 and 31' when assembled extend into the main body portion 34 of the transmission 14.

The main body portion 34 is cylindrical and has tapered openings or channels 35 and 35'. The opening 35 is wider at 36, and tapers very gradually to a narrower dimension at 37; similarly, the opening 35' is wider at 36' and tapers very gradually to its narrower dimension at 37'. Centrally of the main body portion 34, there is an opening 38 having a diameter substantially equal to the outer diameter of the cylindrical portion 28 of the shaft adapter 25. There is a pair of pins 39 set into and protruding from the main body portion 34 which extend into holes 40 of cover plate 41. The cover plate 41 holds the mechanism within the body 34, the mechanism consisting of cylindrical checks and springs to urge the checks toward their locking position.

The actuating means for the transmission is the sprocket 15, which acts through the cover plate 41 to rotate the body 34. Still looking at FIG. 2, it will be seen that the cover plate 41 has a central, circular hole 42 which has opposed linearly extending openings 43 communicating therewith and terminating well within the confines of the cover plate 41. Referring to FIG. 3, the sprocket 15 has a pair of projections 44 and 44' immediately adjacent a central aperture 45, the arrangement being such that a tubular portion 28' of the shaft adapter 25 will be received within the aperture 45, and the projections 44 and 44' will be received within the linear openings 43. Thus, the sprocket 15 is mounted on the transmission device, and is fixed for rotation with the cover plate 41. A screw 46 is threadedly received by a threaded hole 47 in the tubular portion 28' of the shaft adapter 25 to hold the entire assembly together.

Figure 4:
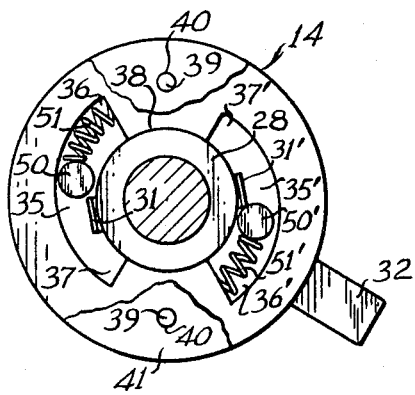

Attention is now directed to FIG. 4 of the drawing for a more detailed description of the mechanism. Within the opening or channel 35 of the body 34, there is a cylindrical check 50. The check 50 is of such diameter that it will fit rather loosely within the wider end 36 of the channel 35, but will not fit into the narrower end 37. A spring 51 abuts the end wall of the end 36, and bears against the check 50 to urge the check 50 toward the narrow end 37 of the channel 35. However, it will be seen that the finger 31 projects into the channel 35 between the check 50 and the narrow end 37 of the channel 35. Thus, when the finger 31 is positioned to allow the check 50 to move to a point within the channel 35 that is sufficiently small so that the check 50 will wedge between the side of the channel 35 and the shaft adapter 25, the body 34 is locked to the shaft adapter 25. More particularly, the check 50 will prevent relative rotation between the body 34 and the shaft adapter 25 when the check 50 is urged into the narrower end 37 of the opening 35, but will allow relative rotation between the main body 34 and shaft adapter 25 when the check 50 is urged to roll into the wider end 36; hence, unidirectional rotation is allowed.

Now, if the arm 32 is rotated to force the check 50 into the wider end 36 of the opening 35, it will be seen that the shaft adapter 25 can rotate in either direction relative to the body 34, the finger 31 preventing movement of the check 50 into the narrower end 37 and into locking position. There are two checks; however, since they and their arrangement for operation are alike, the other will not be described in detail. Comparable parts have the same numerals applied as in the above description, having primes on the numerals that apply to the second like arrangement.

In operation, the transmission device 14 is mounted on the projector 10 as described above, and in the rotary path of the arm 32 there is a stop S attached to the projector. When the solenoid 19 is energized, and the plunger 18 is moved rearwardly as viewed in FIG. 1, the chain 16 will be moved to cause rotation of the sprocket 15, and since the sprocket 15 is drivingly connected to the cover plate 41, which is connected to the body 34, the body 34 will be rotated clockwise. This rotation will be in the direction to urge the checks 50 and 50' to roll into the narrower ends 37 and 37' of the channels 35 and 35', and the fingers 31 and 31' will allow such rolling since the releasing ring 29 is freely rotatable; hence, the body 34 will be locked to the shaft adapter 25, and rotation of the body 34 will cause rotation of the shaft adapter 25 to rotate the shaft 12.

At the end of the movement of the plunger 18, the spring 21 will urge the chain 16 in the opposite direction, and rotate the sprocket 15 in the opposite counter-clockwise direction. This rotation will be in the direction that urges the checks 50 and 50' to roll toward the wider ends 36 and 36' of the channels 35 and 35'. Therefore, the body 34 can rotate relative to and independently of the shaft adapter 25. It can be seen in FIG. 4 that the checks 50 and 50' will urge the fingers 31 and 31' to rotate, which will move the releasing ring 29 and its arm 32. When the arm 32 hits the stop S, further rotation of the body 34 will cause the fingers 31 and 31' to urge the checks 50 and 50' toward the ends 36 and 36' to prevent a locking action, thus allowing rotation of the body 34, to a limited extent, in either direction. This limited extent is enough to allow the film feed (not shown) to be adjusted and properly frame the picture in the projector.

It will thus be seen that the device of the present invention provides a very simple, yet efficient mechanism to allow automatic indexing of a film strip projector.

We claim:

1. In a projector for showing film strips in frame-by-frame sequence having a film drive shaft, a drive means, a solenoid including a selectively retractable plunger, a chain having one end attached to said plunger and operatively connected to said drive means, and a resilient means attached to the other end of said chain for urging said plunger toward an extended position, the combination therewith of a unidirectional rotation transmission device connecting said shaft and said drive means for selectively rotating said shaft in one direction comprising:

(a) a first member freely and rotatably mounted on said film drive shaft and drivingly connected to said drive means said first member defining at least one channel between said member and said shaft, said channel being wider at one end than at the other;

(b) a cylindrical check positioned within said channel for drivingly connecting said first member with said film drive shaft in driving relation, said check having a diameter less than the width of said channel at its wider end and greater than the width of said channel at its narrower end; and, (c) releasing means carried by said shaft and rotatable independently thereof, said releasing means being selectively movable independently of said first member, and said releasing means including a movable finger extending into said channel between said check and said narrow end of said channel effective to engage said check upon selective rotation thereof to urge said check toward said wider end of said channel to disconnect said shaft from said first member for free rotation of said shaft with respect to said first member so that the frame to be shown may be properly centered for projection.

References Cited

UNITED STATES PATENTS

| | | | |
|---|---|---|---|
| 503,311 | 8/1893 | Dahl | 192—27 |
| 1,134,283 | 4/1915 | Mursch | 192—27 |
| 1,824,431 | 9/1931 | Hallden | 192—27 |

MILTON KAUFMAN, *Primary Examiner.*